United States Patent [19]

Shaughnessy

[11] Patent Number: 5,183,310

[45] Date of Patent: Feb. 2, 1993

[54] LATCHING MECHANISM FOR CAP TAILGATE DOOR

[75] Inventor: Ernie Shaughnessy, Salem, Oreg.

[73] Assignee: Hunter Manufacturing Inc., Pocatello, Id.

[21] Appl. No.: 754,955

[22] Filed: Sep. 4, 1991

[51] Int. Cl.$^5$ ............................................. B62D 25/08
[52] U.S. Cl. ..................... 296/106; 296/164; 296/56; 292/7; 292/DIG. 29; 292/DIG. 43
[58] Field of Search ............... 296/56, 50, 57.1, 106, 296/146, 164; 292/7, 57-59, DIG. 43, DIG. 29

[56] References Cited

U.S. PATENT DOCUMENTS

| | | | |
|---|---|---|---|
| 210,112 | 11/1978 | Gadbouis | 296/56 X |
| 550,221 | 11/1895 | Euphrat . | |
| 732,965 | 7/1903 | Schermerhorn | 292/58 |
| 1,460,991 | 8/1922 | Alstyne . | |
| 1,548,907 | 8/1925 | Schweim | 292/DIG. 29 |
| 1,763,914 | 11/1928 | Vitale . | |
| 2,041,447 | 5/1936 | Woody | 292/7 |
| 2,744,782 | 5/1956 | Backman | 296/56 X |
| 3,147,031 | 12/1960 | Olander | 292/340 |
| 3,804,440 | 4/1974 | Carey | 292/58 |
| 4,235,047 | 11/1980 | Turner | 296/56 X |
| 4,358,150 | 11/1982 | Nash | 296/56 X |
| 4,413,848 | 11/1983 | Leaver et al. | 292/59 |
| 5,072,984 | 12/1991 | Jackson | 296/56 |

FOREIGN PATENT DOCUMENTS

| | | | |
|---|---|---|---|
| 398967 | 4/1922 | Fed. Rep. of Germany | 296/50 |
| 24179 | 10/1950 | Finland | 292/58 |

Primary Examiner—Dennis H. Pedder
Attorney, Agent, or Firm—Jacobson, Price, Holman & Stern

[57] ABSTRACT

A single T-handle latching mechanism including a center T-handle, a rotor assembly, a right and left swivel connector, a right and left rod rotator, a right and left lock rod with rotator engagement and a latching contoured end, and a right and left engagement latch plate. An approximately 90 degree rotation of the T-handle will extend the lock rods out to the right and left. With this mechanism, the lock rods also rotate about their axis approximately 180 degrees, with the contoured rod end pulling a door closed as its extension proceeds and, finally, at full extension latching the door securely closed in an engagement latch plate against its frame and sealing, not only in its longitudinal axis, but also in its frontal and horizontal axis.

15 Claims, 3 Drawing Sheets

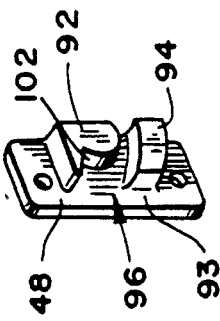
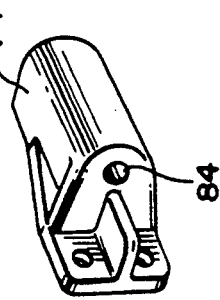
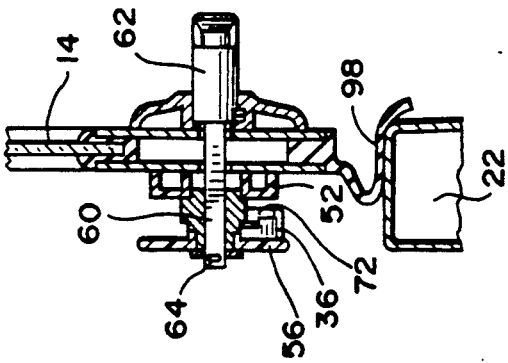
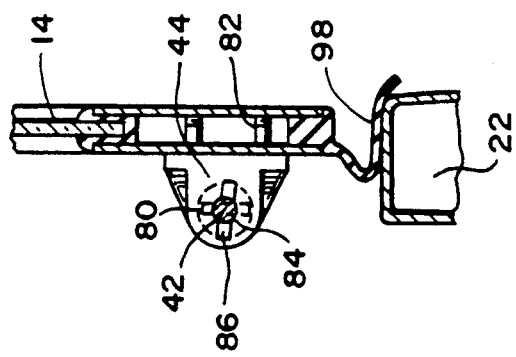
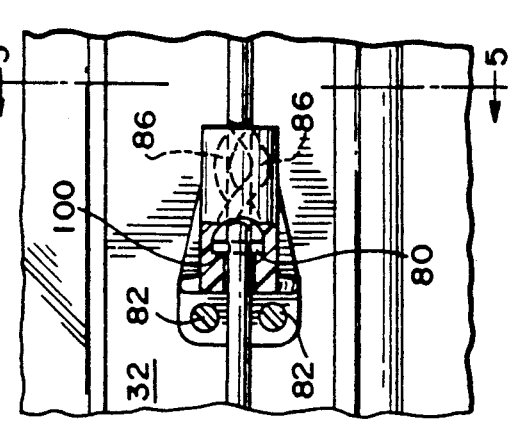
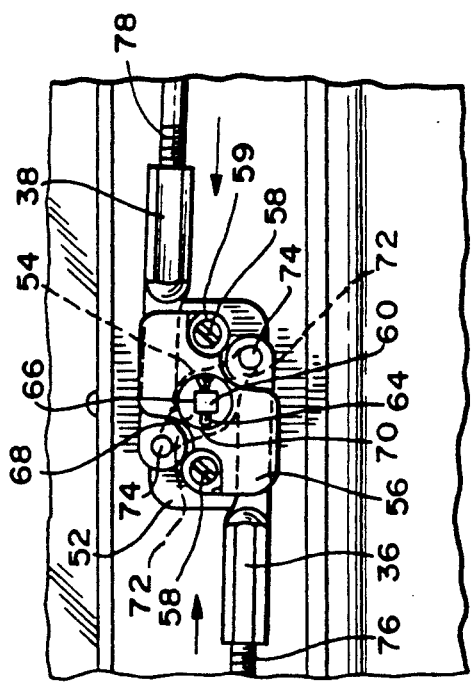

LATCHING MECHANISM FOR CAP TAILGATE DOOR

FIELD OF THE INVENTION

This invention relates to a latching system for a tailgate door on a pickup topper.

BACKGROUND OF THE INVENTION

Latches used on tailgate doors (described as the rear gate door) are hinged at the top and close downwardly and shut against a pickup tailgate, on a pickup "topper", or other equivalent "RV" application, and are of two common types: double T-handle and single T-handle with lock-rods.

The double T-handle is two T-handles, one affixed to each side of the door's lower edges, and each provided with a latch blade that engages against a beveled latch plate affixed to the door frame. Rotating the T-handles approximately 90 degrees pulls the door shut against the door frame and weather seals the door, securing the door in its closed position.

The single T-handle with two lock rods is a single T-handle mounted at the bottom center of the door, provided with a rotor assembly. The two lock-rods are connected to the rotor and extend out to each side, through a rod guide adjacent to the door edge. Again, a beveled latch plate is provided on the door frame at each side.

Rotating the single center T-handle approximately 90 degrees then extends the lock-rods outwardly, both right and left, engaging rods against the latch plates and securing the door in a closed position against the door frame, and weather sealing the door frame.

Security: Because of their design, a locked door can be breached by simply spreading the lower corners of the cap, or by applying enough force at the handle to bend and/or distort the lock-rods or their guides.

Because toppers are of reasonable lightweight construction, when handled during manufacture, shipping, or storage, they tend to lose their fit and dimension at the lower rear portion. This is due to spreading or bending of the sides, thus affecting quality and/or requiring extra handling care and expense, etc. Also, spreading of the sides of the topper is caused, during use, due to vehicle vibration and general wear nd tear.

SUMMARY OF THE INVENTION

The object of this invention addresses shortcomings and defects of the above-described mechanisms.

By the present invention, a single T-handle latching mechanism includes a center T-handle, a rotor assembly, a right and left swivel connector, a right and left rod rotator, a right and left lock rod with rotator engagement and a latching contoured end, and a right and left engagement latch plate.

An approximately 90 degree rotation of the T-handle will extend the lock rods out to the right and left. With this mechanism, the lock rods also rotate about their axis approximately 180 degrees, with the contoured rod end pulling the door of the topper closed as its extension proceeds and, finally, at full extension latching the door securely closed in an engagement latch plate against its frame and sealing, not only in its longitudinal axis, but also in its frontal and horizontal axis. This provides greatly improved security to the user with a fixed and unaltering register of the door and door frame at the manufacturer, and, additionally, providing a strong, three-way positioning hold for handling, shipping, storage, display, and general use.

Alternately, the rotor, swivel connectors, and rod rotator may be combined into one central device. Also, the same rod rotators may be used with a levered center handle in place of a T-handle and rotator.

It is therefore an object of the present invention to provide a latching mechanism for securing a door of a pick-up topper to the sides of the topper by engagement of a contoured end of a lock rod in a complementary shaped engagement latch plate which is secured to the side of a frame for the door.

It is another object of the present invention to provide a latching mechanism for securing a door of a pick-up topper to the sides of the topper by engagement of a contoured end of a lock rod in complementary shaped engagement latch plate which is secured to the side of a frame for the door and having a central, single T-handle which is moved through 90° to shift opposed locking rods through 180° of rotation with simultaneous lateral extension to lock the contoured ends within the latch plates.

It is yet another object of the present invention to provide a latching mechanism for securing a door of a pick-up topper to the sides of the topper by engagement of a contoured end of a lock rod in a complementary shaped engagement latch plate which is secured to the side of a frame for the door and having a central single T-handle which is moved through 90° to shift opposed locking rods through 180° of rotation with simultaneous lateral extension to lock the contoured ends within the latch plates and a pin located on the locking rod being rotated through a rod rotator and engaging a terminal wall of a spiral groove of the rod rotator upon complete turning of 90° of the T-handle and simultaneous engagement of the latching of the contoured ends in the latch plates to prevent further lateral extension of the locking rods and preventing pulling of the door out of its frame by engagement of the contoured ends in the latch plates.

These and other objects of the invention, as well as many of the intended advantages thereof, will become more readily apparent when reference is made to the following description taken in conjunction with the accompanying drawings.

BRIEF DESCRIPTION OF THE DRAWINGS

FIG. 4 is a front view of a rod rotator with a locking rod extending therethrough.

FIG. 5 is a cross-sectional view taken along line 5—5 of FIG. 4.

FIG. 6 is a cross-sectional view taken along line 6—6 of FIG. 2.

FIG. 7 is a front view of a rotor assembly.

FIG. 8 is a perspective view of a rod rotator.

FIG. 9 is a perspective view of an engagement latch plate.

DETAILED DESCRIPTION OF THE PREFERRED EMBODIMENTS

Figure 1:
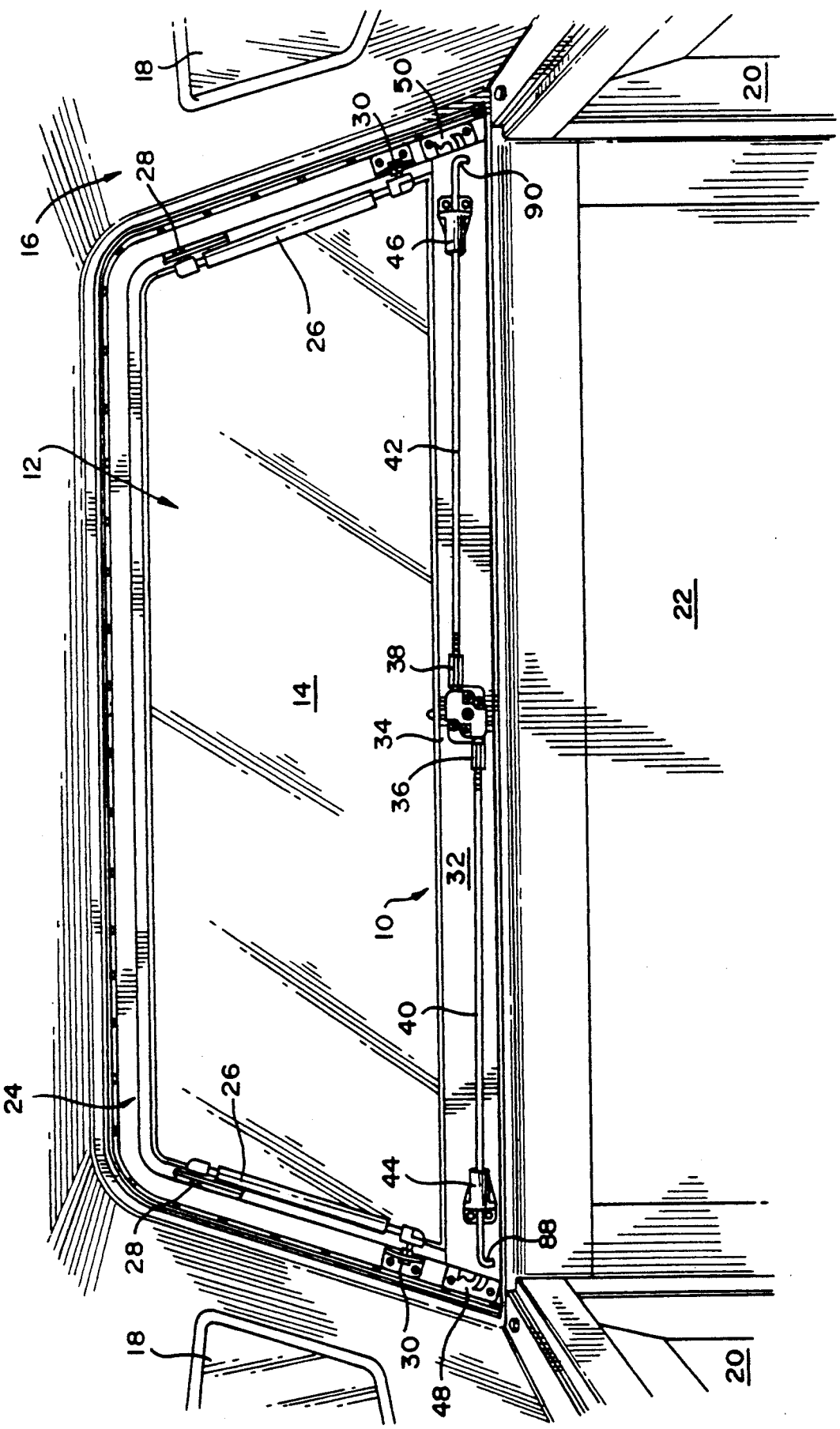
FIG. 1 is a perspective view of a door of a pickup topper having a latching mechanism.

In describing a preferred embodiment of the invention illustrated in the drawings, specific terminology will be resorted to for the sake in clarity. However, the invention is not intended to be limited to the specific terms so selected, and it is to be understood that each specific term includes all technical equivalents which operate in a similar manner to accomplish a similar purpose.

With reference to the drawings, in general, and to Figure 1, in particular, a latching mechanism embodying the teachings of the subject invention is generally designated as 10. With reference to its orientation in FIG. 1, the latching mechanism is used for securing a door 12 with a window 14 at the rear end of a pickup topper or enclosure 16 having side windows 18. The enclosure rests upon the side walls 20 of the payload or bed section of a pickup truck with the door 12 located above the tailgate 22 of the pickup truck.

A frame 24 surrounding the door 12 includes portions attached to the side walls and ceiling of the enclosure. The door 12 is pivotally interconnected with the frame by hydraulic piston cylinders 26. An upper end of the hydraulic piston cylinders 26 is secured at 28 to the door 12 while the lower end is secured to the frame 24 at 30. Part of the door 12 is located below the window 14 is a reinforcing panel 32. Panel 32 moves with the window 14 upon opening of door 12.

Mounted on an interior side of the panel 32 is rotor assembly 34. Extending from the rotor assembly, which is centrally located on panel 32, is left swivel connector 36 and right swivel connector 38. Threaded into swivel connectors 36 and 38 are left locking rod 40 and right locking rod 42, respectively. Locking rods 40, 42 extend through left rod rotator 44 and right rod rotator 46, respectively Mounted on frame 24, which is fixed to the enclosure 16, are left engagement latch plate 48 and right engagement latch plate 50.

Rotor assembly 34 is shown in greater detail in FIG. 7 as including base plate 52, rotor 54 and cover 56. The base plate is secured to the panel 32 by screws 58 passing through holes 59 in the cover 56 passing through the base plate and into the panel 32. Screws 58, on the other side of the panel 32, are secured to mounting plate 61 of T-handle 62.

All three of the base plate, rotor and cover include a central opening with the center of the rotor 54 including a square-shaped opening 66 through which passes a square-shaped stem 60 of T-handle 62, shown in FIG. 6, and secured in place by a cotter pin 64 passing laterally through the stem 60. A circular portion 68 of the rotor 54 is shown extending through an opening 70 of the cover 56.

Rotor 54 includes two opposed arms 72 extending from circular portion 68 and having upstanding projections 74 at the terminal end of the arms 72. The projections 74 engage within openings of swivel connectors 36 and 38 for opposed lateral movement of the swivel connectors 36, 38 away from the rotor assembly.

Respective ends 76, 78 of left and right locking rods 40, 42 are threaded and are threadingly engaged within swivel connectors 36 and 38, respectively. The swivel connectors are maintained secured to the projection 74 by extending through a gap formed between the cover 56 and base plate 52, as shown in FIG. 6.

Towards the outermost lateral end of locking rods 40 and 42 is located a transversely extending rotator engager or roll pin 80 extending through and perpendicular to the locking rods 40, 42. Pin 80 is positioned on the locking rods within rod rotators 44 and 46. Rod rotators 44 and 46, as shown in FIG. 4, are fixed in position on panel 32 by screws 82.

The rod rotators include a central bore 84 through which the locking rods 40, 42 slide. The roll pin 80 extending through each of the locking rods travels within a spiral groove 86 of the rod rotators, extending radially outwardly from central bore 84, in a spiral configuration.

At the opposite end of locking rods 40 and 42 from ends 76, 78 is hook shaped portions 88, 90, respectively, serving as a latching contoured end. The latching contoured ends are bent to an angle of less than 90° so as to have a slight hooking appearance.

Spaced laterally outwardly from the contoured end 88, 90 are engagement latch plates 48, 50. The latch plates are secured to the sides of the frame 24 by screws 91.

With reference to FIG. 9, left engagement latch plate 48 is shown having flat portion 93 with two projection portions 92 and 94 defining a gap 96 therebetween. The gap 96 is shaped complementary to the contoured ends 88 and 90 of the locking rods to receive the contoured ends of the locking rods when the contoured ends extend upwardly. The contoured hook-shaped portions 88, 90 curve around projection portion 92 so as to draw the latch plates inwardly toward the rotor assembly.

Figure 2:
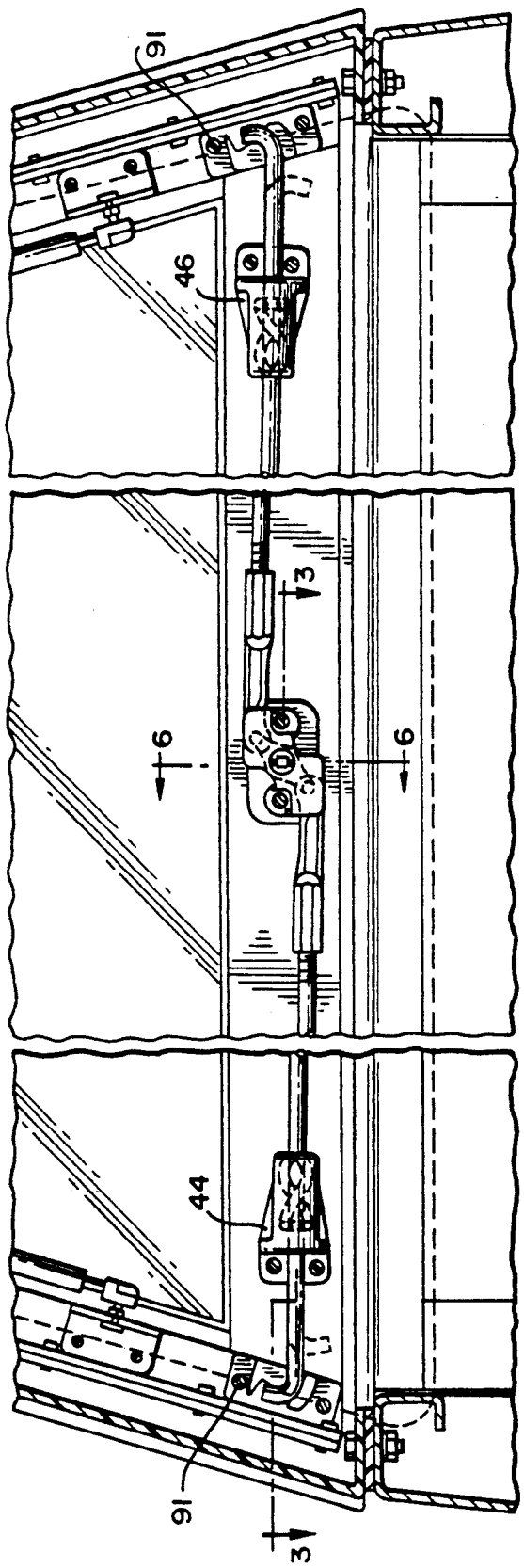
FIG. 2 is a front view of the latching mechanism with portions broken away to indicate extended length.
Figure 3:
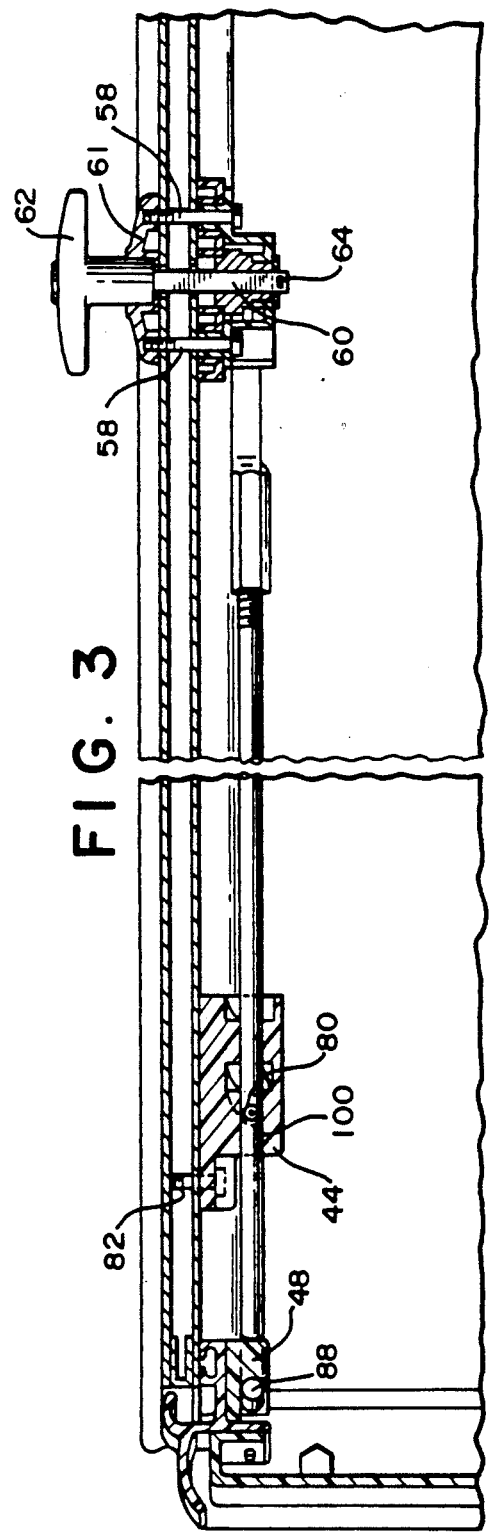
FIG. 3 is a sectional view taken along line 3—3 of FIG. 2 with portions broken away to indicate extended length.

In operation, the latching mechanism begins in the open position, as shown in solid lines in FIGS. 1 and 7, and in dotted lines in FIG. 2, with the terminal portions of the contoured ends 88, 90 pointing in a downward direction. In this position, the door 12 may be swung open away from the enclosure 16 and tailgate to gain access to the bed of the pickup truck.

Upon rotation of the T-handle 62 through substantially 90°, the square shaped stem 60 engaged in the opening 66 of rotor causes the rotor to move from the position shown in FIGS. 1 and 7 to the position shown in solid lines in FIG. 2. The swivel connectors 36, 38 anchored on the projections 74 of the arms 72 of the rotor are moved with the rotor by the T-handle to cause outward lateral movement of the swivel connectors away from the rotor assembly. The locking rods threadingly engaged at ends 76, 78 in the swivel connectors are also, therefore, moved laterally outwardly away from the rotor assembly.

The roll pin 80 of each locking rod is caused to move within the spiral groove 86 of each rod rotator 44, 46. Locking rods 40, 42 are thereby rotated through 180° of movement and spun within swivel connectors 36, 38 with simultaneous outward lateral movement. Latching contoured ends 88, 90 are thereby moved outwardly and turned from a downward position to an upward position and into gap 96 of the engagement latch plates 48, 50 as shown in solid lines in FIG. 2. In this closed position, weatherstripping engages the upper edge of the tailgate 22 to prevent access of the elements to the interior of the enclosure 16.

In the closed position of the latching mechanism, the roll pin 80 is located at the end wall 100, as shown in FIG. 4, of the spiral groove 86. In this position, it is impossible to continue to force the continued turning of the T-handle 62 in the closing direction due to the engagement by the roll pin with the end wall 100. This prevents forcible breaking of the T-handle of the door 12 so as to prevent unwanted entry. Further, pulling outwardly on the T-handle in an attempt to force the locking rods away from the frame is prevented by the secure engagement of the contoured ends 88, 90 within the gap 96 of the latch plates 48, 50. Also, during the movement of the contoured ends 88, 90 into the gaps 96 of the latch plates 48, 50, the sides of enclosure 16 are drawn inwardly by the contoured ends extending around curved portion 102 of projection 92 of the latch plates. Therefore, in the closed position, several different counteracting forces are applied to secure the door 12 in the frame 24 of the enclosure 16 for locking of the door.

Having described the invention, many modifications thereto will become apparent to those skilled in the art to which it pertains without deviation from the spirit of the invention as defined by the scope of the appended claims.

I claim:

1. A latch assembly for a cap tailgate door, said latch assembly comprising:
   rotor means mounted on the tailgate door for securing the tailgate door in a closed position after movement from an open position, and
   latch plate means mounted on a frame of the cap for engagement by the rotor means in the closed position,
   said rotor means including
   (a) two elongated locking rods each having two ends, one end of said two rods including a bent end shaped complementary to a channel defined by the latch plate means for engagement by the bent ends in a locked position,
   (b) rotator means fixedly mounted on the tailgate door for rotating said locking rods during movement from an unlocked position to the locked position, and
   (c) a rotor assembly fixedly mounted on the tailgate door for moving said locking rods to the unlocked position and the locked position, the other end of said two rods being rotatably mounted on said rotor assembly.

2. A latch assembly as claimed in claim 1, wherein said rotator means includes a spiral groove engaged by a pin in said locking rods.

3. A latch assembly as claimed in claim 1, wherein said pin engages an end wall of said spiral groove in said locked position.

4. A latch assembly as claimed in claim 3, wherein said locking rods turn by approximately 180° during movement from the unlocked position to the locked position.

5. A latch assembly according to claim 1, wherein each of said two rods extend through a single one of said rotator means.

6. A latch assembly according to claim 1, wherein said rotator means are located between said rotor assembly and said latch means.

7. A cap for a pickup truck, said cap comprising:
   an enclosure including side walls and a ceiling,
   a door partially surrounded by a frame formed by the side walls and the ceiling,
   rotor means mounted on the door for securing the door in a locked position, and
   latch plate means mounted on a frame of the cap for engagement by the rotor means in the closed position,
   said rotor means including
   (a) two elongated locking rods each having two ends, one end of said two rods including a bent end shaped complementary to a channel defined by the latch plate means for engagement by the bent ends in the locked position,
   (b) rotator means fixedly mounted on the tailgate door for rotating said locking rods during movement from an unlocked position to the locked position, and
   (c) a rotor assembly fixedly mounted on the tailgate door for moving said locking rods to the unlocked position and the locked position, the other end of said two rods being rotatably mounted on said rotor assembly.

8. A cap as claimed in claim 7, wherein the locking rods move laterally and are rotated during movement from the unlocked position of the rotor means to the locked position.

9. A cap as claimed in claim 7, wherein said rotator means includes a spiral groove engaged by a pin on said locking rods.

10. A cap as claimed in claim 9, wherein said pin engages an end wall of said spiral groove in said locked position.

11. A cap as claimed in claim 8, wherein said rotor means includes a T-handle extending through said rotor assembly, and said T-handle turning said rotor means to said unlocked position.

12. A cap as claimed in claim 7, wherein said bent end is turned from a downwardly extending position to an upwardly extending position by said rotator means.

13. A cap cover comprising:
    an enclosure including side walls and a ceiling,
    a door partially surrounded by a frame formed by the side walls and the ceiling,
    rotor means mounted on the door and being movable between an unlocked position to allow swinging of the door and a locked position of for locking of the door in the frame,
    latch plate means mounted on the frame,
    said rotor means including
    (a) two elongated locking rods each having two ends, one end of said two rods including a bent end shaped complementary to a channel defined by the latch plate means for engagement by the bent ends in the locked position so a to pull the side walls towards each other and to prevent forcible opening of the door when in its closed position,
    (b) rotator means fixedly mounted on the tailgate door for rotating said locking rods during movement from the unlocked position to the locked position, and
    (c) a rotor assembly fixedly mounted on the tailgate door for moving said locking rods to the unlocked position and the locked position, the other end of said two rods being rotatably mounted on said rotor assembly.

14. A cap cover as claimed in claim 13, wherein said rotator means includes a spiral groove engaged by a pin on said locking rods.

15. A cap cover as claimed in claim 14, wherein said pin engages an end wall of said spiral groove in said locked position.

* * * * *